(12) United States Patent
Lin et al.

(10) Patent No.: US 11,810,010 B2
(45) Date of Patent: Nov. 7, 2023

(54) TWO TIER AUTOMATIC COST ESTIMATION FOR AUTOMATIC MANUFACTURE OF SPARE PARTS

(71) Applicant: THE BOEING COMPANY, Chicago, IL (US)

(72) Inventors: Pei Yu Lin, Seattle, WA (US); Joseph F. Rice, Lake Stevens, WA (US); Andrey A. Zaikin, Renton, WA (US)

(73) Assignee: THE BOEING COMPANY, Arlington, VA (US)

( * ) Notice: Subject to any disclaimer, the term of this patent is extended or adjusted under 35 U.S.C. 154(b) by 1270 days.

(21) Appl. No.: 16/053,168

(22) Filed: Aug. 2, 2018

(65) Prior Publication Data
US 2020/0042889 A1    Feb. 6, 2020

(51) Int. Cl.
*G06N 5/048* (2023.01)
*G06N 20/00* (2019.01)
*G06Q 10/0631* (2023.01)
*G06Q 50/04* (2012.01)

(52) U.S. Cl.
CPC .......... *G06N 5/048* (2013.01); *G06N 20/00* (2019.01); *G06Q 10/06315* (2013.01); *G06Q 50/04* (2013.01)

(58) Field of Classification Search
CPC .. G06N 5/048; G06N 20/00; G06Q 10/06315; G06Q 50/04
USPC .......................................................... 706/12
See application file for complete search history.

(56) References Cited

U.S. PATENT DOCUMENTS

| 5,249,120 A | 9/1993 | Foley |
| 7,346,588 B2 | 3/2008 | Shimizu et al. |
| 2007/0156543 A1 | 7/2007 | Klim et al. |
| 2010/0082124 A1* | 4/2010 | Stephenson .......... G05B 13/048 700/33 |
| 2012/0029974 A1* | 2/2012 | Councill ............ G06Q 10/0631 707/705 |

(Continued)

FOREIGN PATENT DOCUMENTS

EP    3605419 A1    2/2020

OTHER PUBLICATIONS

"Product Development Cost Estimation in Mass Customization", Tu, 2007 (Year: 2007).*

(Continued)

*Primary Examiner* — Charles Guiliano
*Assistant Examiner* — Po Han Lee
(74) *Attorney, Agent, or Firm* — Patterson + Sheridan, LLP

(57) ABSTRACT

Techniques for automatically manufacturing mechanical parts are described. A first estimate of manufacturing cost for a first mechanical part is generated using a first machine learning model. In response to determining that the first estimate of manufacturing cost for the first mechanical part falls within a range of effectivity for the first machine learning model, a second estimate of manufacturing cost for the first mechanical part is generated using a second machine learning model. An expected cost error in the second estimate of manufacturing cost for the first mechanical part is determined, and upon determining that the expected cost error falls within a pre-determined acceptable range, automatic manufacturing of the first mechanical part is facilitated.

14 Claims, 10 Drawing Sheets

(56) References Cited

U.S. PATENT DOCUMENTS

2018/0120813 A1\* 5/2018 Coffman ............. G05B 19/401
2020/0042889 A1 2/2020 Lin et al.

OTHER PUBLICATIONS

Innovation, Science and Economic Development Canada, Office Action for Application 3,045,989 dated Aug. 10, 2022.
Japanese Patent Office, Notice of Reasons for Rejection for Application 2019-106102 dated May 29, 2023.

\* cited by examiner

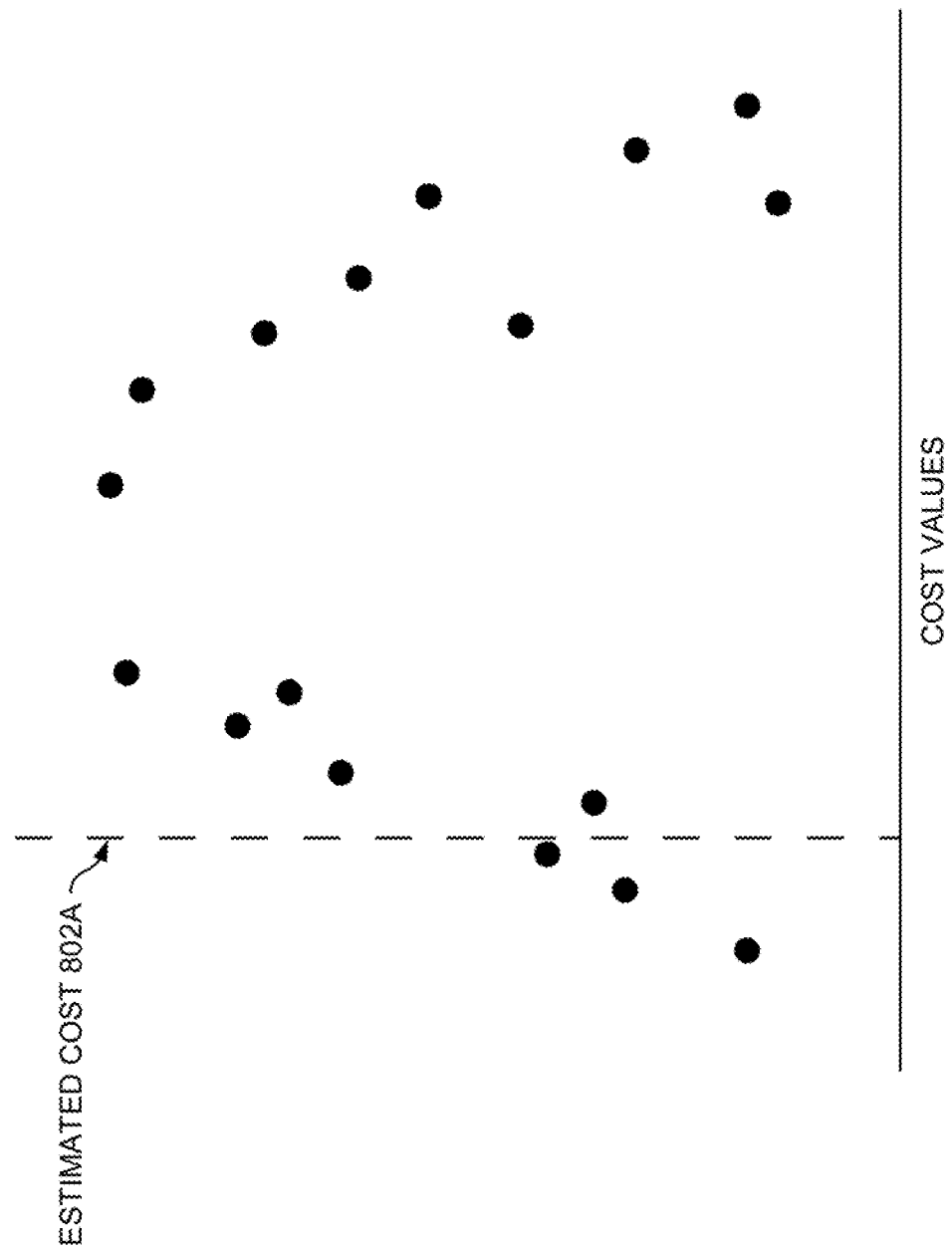

TWO TIER AUTOMATIC COST ESTIMATION FOR AUTOMATIC MANUFACTURE OF SPARE PARTS

FIELD

Aspects of the present disclosure provide techniques for automatic cost estimation and manufacture of spare parts.

BACKGROUND

Acquiring a new part from a supplier can be a lengthy process. Engineers may be required to fully document the structure, material, and fabrication process (machining, assembly, inspection, etc.) for the part and to estimate the likely cost. This estimate can be based on the engineer's experience and a cursory analysis of the historical cost of similar parts, among other factors. A person in charge of procuring the part can then distribute a Request for Proposal (RFP) to potential suppliers, and can select a supplier based on responses to the RFP. The procurer can then negotiate a schedule, and determine the desired quantities and the delivered cost—the price of the part when purchased from the supplier. This process is generally time-consuming, expensive, and inefficient.

SUMMARY

Embodiments described herein include a method for automatically manufacturing mechanical parts. The method includes generating, using one or more computer processors, a first estimate of manufacturing cost for a first mechanical part using a first machine learning model. The method further includes determining that the first estimate of manufacturing cost for the first mechanical part falls within a range of effectivity for the first machine learning model, and in response generating, using the one or more computer processors, a second estimate of manufacturing cost for the first mechanical part using a second machine learning model. The method further includes determining an expected cost error in the second estimate of manufacturing cost for the first mechanical part. The method further includes, upon determining that the expected cost error falls within a pre-determined acceptable range, facilitating automatic manufacturing of the first mechanical part.

Embodiments described herein further include a system. The system includes a processor and a memory storing a program, which, when executed on the processor, performs an operation. The operation includes generating a first estimate of manufacturing cost for a first mechanical part using a first machine learning model. The operation further includes determining that the first estimate of manufacturing cost for the first mechanical part falls within a range of effectivity for the first machine learning model, and in response generating a second estimate of manufacturing cost for the first mechanical part using a second machine earning model. The operation further includes determining an expected cost error in the second estimate of manufacturing cost for the first mechanical part. The operation further includes, upon determining that the expected cost error falls within a pre-determined acceptable range, facilitating automatic manufacturing of the first mechanical part.

Embodiments described herein further include a computer program product for automatically manufacturing mechanical parts. The computer program product includes a computer-readable storage medium having computer-readable program code embodied therewith, the computer-readable program code executable by one or more computer processors to perform an operation. The operation includes generating a first estimate of manufacturing cost for a first mechanical part using a first machine learning model. The operation further includes determining that the first estimate of manufacturing cost for the first mechanical part falls within a range of effectivity for the first machine learning model, and in response generating a second estimate of manufacturing cost for the first mechanical part using a second machine earning model. The operation further includes determining an expected cost error in the second estimate of manufacturing cost for the first mechanical part. The operation further includes, upon determining that the expected cost error falls within a pre-determined acceptable range, facilitating automatic manufacturing of the first mechanical part

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

FIGS. 8A-B are an illustration of estimated and actual manufacturing costs, according to one embodiment described herein.

DETAILED DESCRIPTION

Aspects of the present disclosure relate to techniques for automatic cost estimation and manufacture of mechanical parts. Instead of the manual process outlined above, the time (and associated cost) of acquiring a new part can be reduced by specific techniques for automating the process of estimating the likely cost. The automated estimate is often accurate enough that the desired part can then be ordered from, and automatically manufactured by, a pre-qualified supplier. This avoids the full cycle of distribution of RFPs to potential suppliers, selection of a supplier, and negotiation of schedule, quantities and delivered cost, outlined above.

But automatic manufacture can be challenging. The sales price of a part to a customer can depend on the manufacturing cost of the part. For the sale to be profitable, the sales price of the part is greater than the manufacturing cost. But if the manufacturing cost of a part is estimated too low, the part may be sold at too low of a price, and the business could take a loss (or lower than expected profit) on the sale.

It is desirable to automatically estimate the manufacturing cost of a part, while identifying the potential error in the estimate to determine whether the part is suitable for automatic manufacture. In an embodiment, machine learning techniques can be used to identify a range of effectivity for spare part manufacturing cost estimates. If a given cost estimate for a part falls within this range of effectivity, the estimate is likely to be accurate. In an embodiment, machine learning techniques can then be used to estimate a cost for a given spare part that falls within the range of effectivity. This estimate can be based on characteristics of the part, as discussed below. In an embodiment, a weighted error can be determined for the cost estimate—if the weighted error is sufficiently low, the system can initiate automatic manufacturing of the part.

Figure 1:
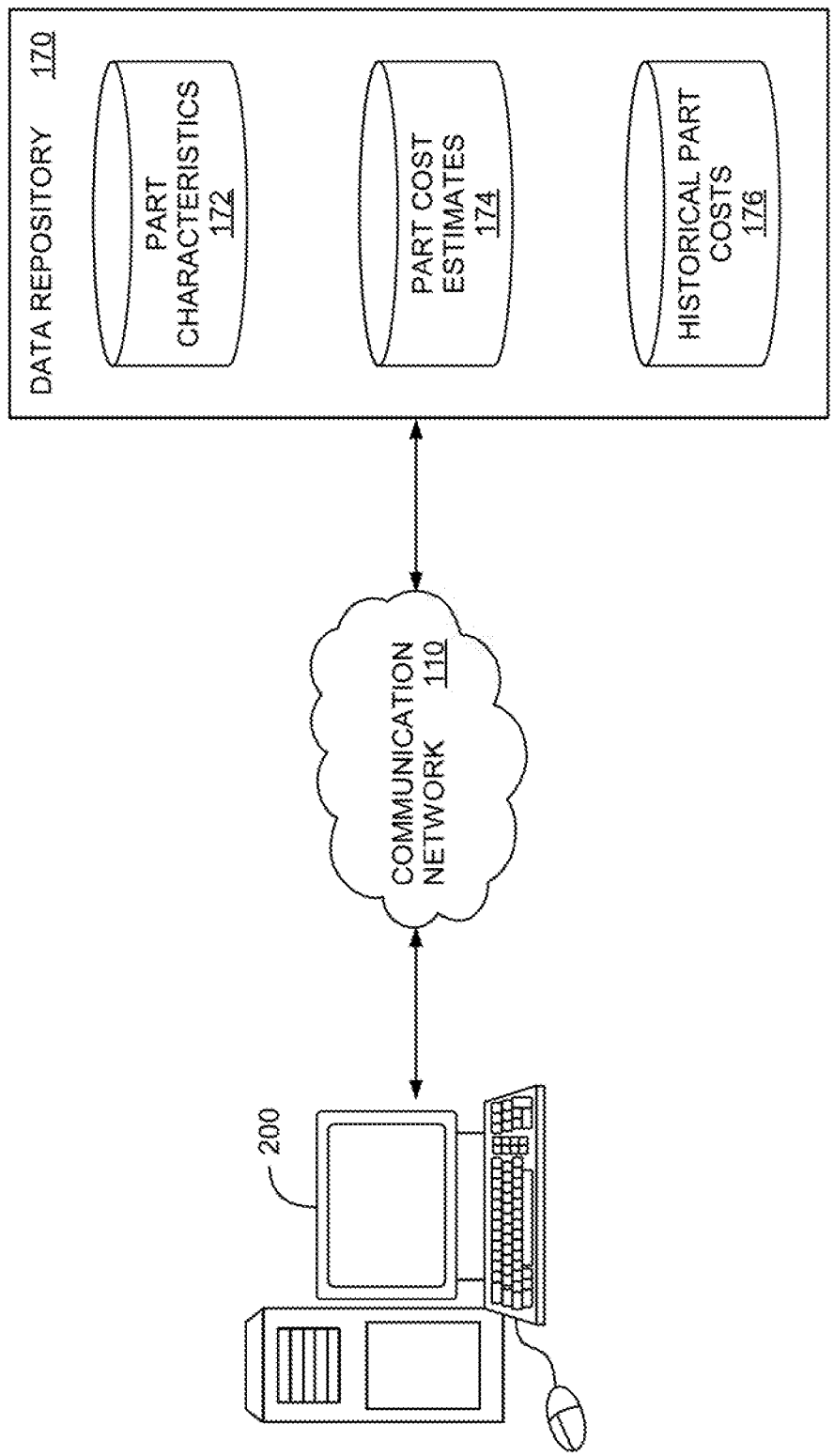
FIG. 1 is a block diagram illustrating automatic prediction of the cost of manufacturing a spare part, according to one embodiment described herein.

FIG. 1 is a block diagram illustrating automatic prediction of the cost of manufacturing a spare part, according to an embodiment. A prediction server 200 is connected to a communication network 110. The prediction server 200 is described in more detail with regard to FIG. 2. The prediction server 200 is generally configured to implement automatic prediction of the cost of manufacturing a spare part, along with facilitating automatic manufacturing of the spare part (if suitable).

The communication network 110 can be any suitable communication network, including the Internet, a local access network, or a wide access network. The communication network 110 can be a wired or wireless network. The communication network can use any suitable communication protocol, including any suitable wireless protocol. For example, the communication network 110 can use an Institute for Electrical and Electronics Engineers (IEEE) Wi-Fi standard, like an 802.11 standard, another Wi-Fi standard, a cellular protocol (including 3G, Long-Term Evolution (LTE), 4G and others), Bluetooth, and others. Further, the communication network 110 can use several different communication protocols.

The communication network 110 is further connected to the data repository 170. The data repository 170 can be any suitable data storage medium. For example, the data repository 170 can include a relational database, or any other suitable database. In an embodiment, the data repository 170 includes network interface software and hardware to allow for communication with the communication network 110. For example, the data repository 170 can include a server computer with a network interface. As another example, the data repository 170 could be included within the prediction server 200. Alternatively, as discussed further below, the data repository 170 could be a cloud-based storage system, accessible via the communication network 110.

The data repository 170 includes data for use by the prediction server 200 in automatic prediction of the cost of manufacturing a spare part, along with facilitating automatic manufacturing of the spare part. In the illustrated embodiment, the data repository 170 includes part characteristics 172 for a variety of spare parts. The part characteristics 172 can include a variety of data related to the spare parts, including dimensional attributes, metallurgy, year of introduction, manufacturing process, part numbers, part description, part mass or weight, a Bill of Materials (BOM) for the part, and any other suitable data.

Figure 2:
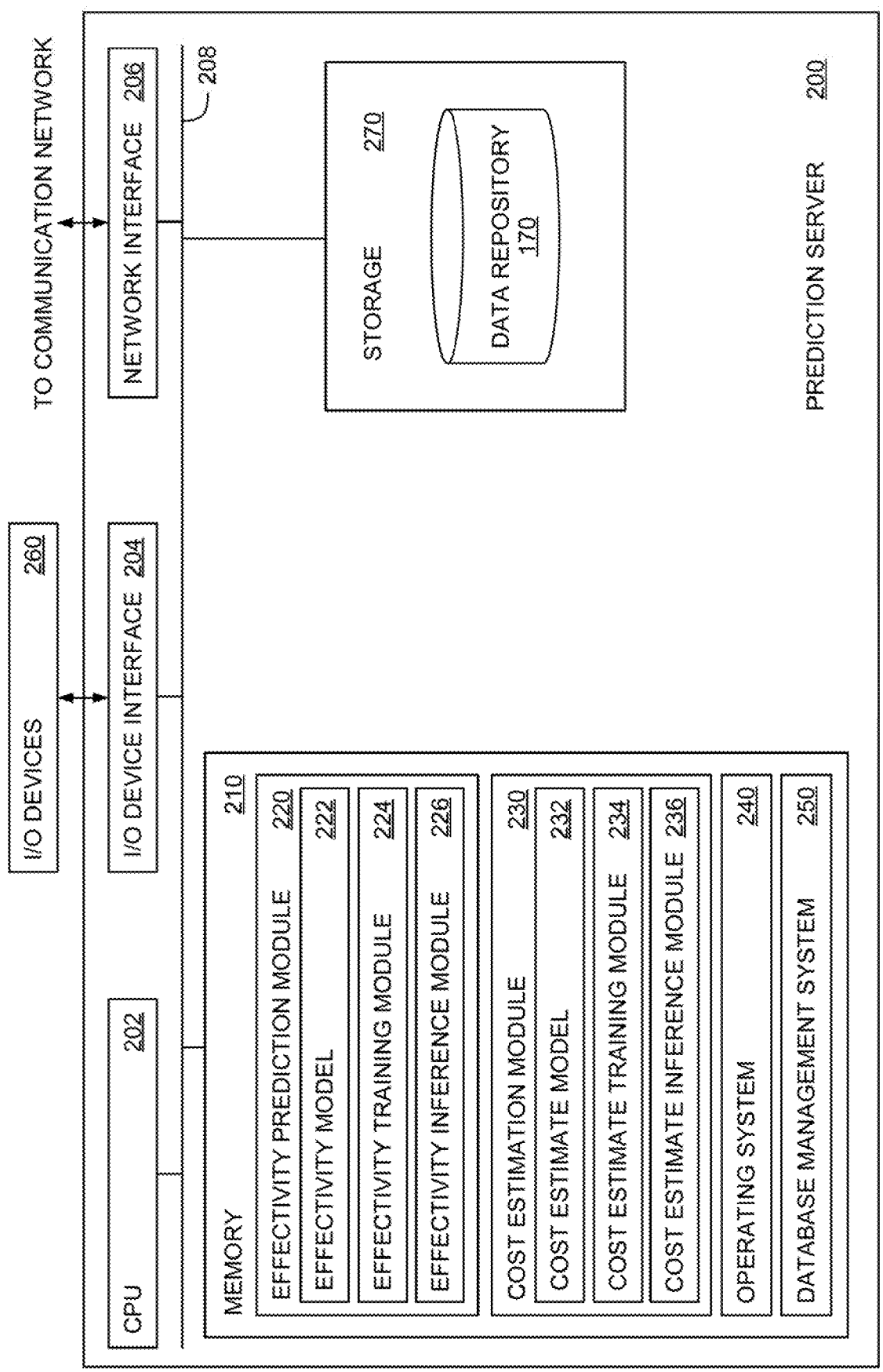
FIG. 2 is a block diagram illustrating a prediction server, according to one embodiment described herein.
Figure 3:
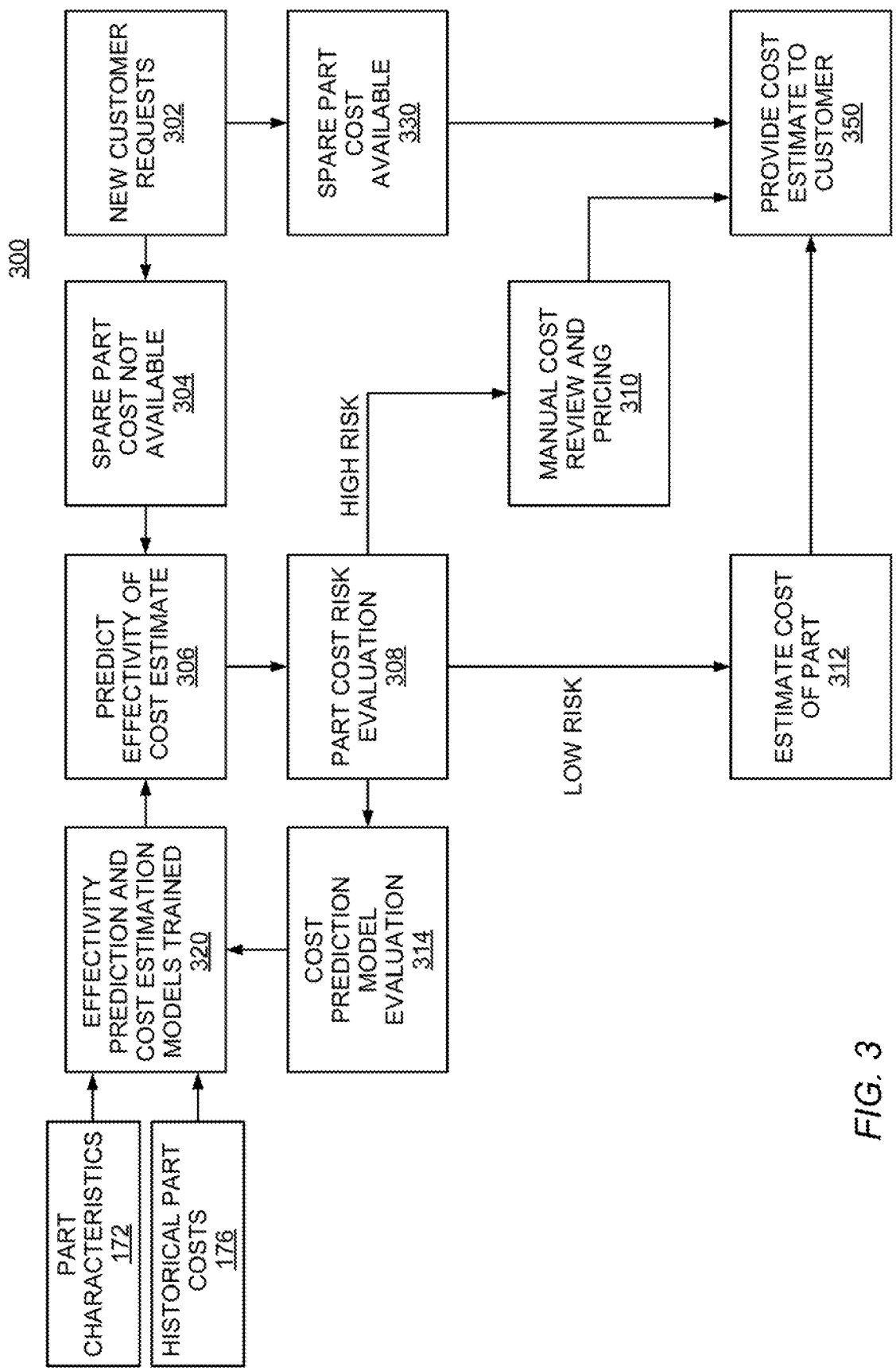
FIG. 3 is a flow chart illustrating automatic prediction of the cost of manufacturing a spare part, according to one embodiment described herein.

The data repository 170 further includes part cost estimates 174. The part cost estimates 174 can include previous cost estimates for the spare parts, including previous automatic cost estimates using the various techniques described herein, other automatic cost estimates, and manual cost estimates. The data repository further includes historical part costs 176. The historical part costs 176 can include actual costs for the various spare parts, including actual manufacturing costs, actual purchase costs, actual sales prices, and other suitable data. Further, the data in the data repository 170 can include data related to parts from multiple part vendors. In an embodiment, the part vendor can be used as a factor in training the effectivity prediction model and the cost estimation model, as illustrated in FIGS. 2 and 3. The illustrated data in the data repository 170 are merely examples, and other data can also be included.

FIG. 2 is a block diagram illustrating a prediction server 200, according to an embodiment. As shown, the prediction server 200 includes, without limitation, a central processing unit (CPU) 202, a network interface 206, a memory 210, and storage 270, each connected to a bus 208. In an embodiment, the prediction server 200 also includes an Input/Output (I/O) device interface 204 for connecting to I/O devices 260. In an embodiment, the I/O devices 260 can be external I/O devices (e.g., keyboard, display and mouse devices). Alternatively, the I/O devices 260 can be built in I/O devices (e.g., a touch screen display or touchpad). Further, in context of this disclosure, the computing elements shown in the prediction server 200 may correspond to a physical computing system (e.g., a system in a data center) or may be a virtual computing instance executing within a computing cloud, as discussed further below.

The CPU 202 retrieves and executes programming instructions stored in the memory 210 as well as stores and retrieves application data residing in the storage 270. The bus 208 is used to transmit programming instructions and application data between the CPU 202, the I/O device interface 204, the storage 270, the network interface 206, and the memory 210. The CPU 202 is included to be representative of a CPU, multiple CPUs, a single CPU having multiple processing cores, graphics processing units (GPUs) having multiple execution paths, and the like. The memory 210 is generally included to be representative of electronic storage of any suitable type(s), including random access memory or non-volatile storage. The storage 270 may be a disk drive storage device. Although shown as a single unit, the storage 270 may be a combination of fixed and/or removable storage devices, such as fixed disc drives, removable memory cards, network attached storage (NAS), or a storage area-network (SAN).

Illustratively, the memory 210 includes an operating system 240 and a database management system (DBMS) 250, while the storage 270 includes a data repository 170 (e.g., a database). The operating system 240 generally controls the execution of application programs on the prediction server 200. Examples of operating system 240 include, without limitation, versions of UNIX, distributions of the Linux® operating system, versions of Microsoft® Windows® and so on. The DBMS 250 generally facilitates the capture and analysis of data in the data repository 170 (e.g., spare part data). For instance, the DBMS 250 could enable the definition, creation, querying, update and administration of the data repository 170. As an example, the DBMS 250 could receive a query (e.g., composed using Structured Query Language (SQL)) and, in response, could generate an execution plan that includes one or more access routines to be run against the data repository 170. The DBMS 250 could then execute the access routine(s) and could return any query result data to the requestor.

The memory 210 generally includes program code for performing various functions related to automatic prediction of the cost of manufacturing a spare part, along with facilitating automatic manufacturing of the spare part. The program code is generally described as various functional "applications," "components," or "modules" within the memory 210, although alternate implementations may have different functions and/or combinations of functions. Within the memory 210, the effectivity prediction module 220 is generally configured to predict the effectivity of a cost estimate for a spare part.

In an embodiment, the effectivity prediction module 220 uses machine learning to predict this effectivity. In this embodiment, the effectivity prediction module 220 includes an effectivity model 222, an effectivity training module 224, and an effectivity inference module 226. The effectivity training module 224 is generally configured to facilitate training of the effectivity model 222. As discussed further below, in relation to FIG. 5, in an embodiment the effectivity training module 224 can be run multiple times to tune the effectivity model 222. The effectivity inference module 226 is generally configured to predict the effectivity of a manufacturing cost estimate for a spare part, using the effectivity model 222.

The memory 210 further includes a cost estimation module 230. The cost estimation module 230 is generally configured to automatically estimate the cost of a spare part (e.g., when the effectivity prediction module 220 determines that the estimate is likely to be sufficiently effective to allow for automatic estimation). In an embodiment, the cost estimation module 230 also uses machine learning to predict this effectivity. In this embodiment, the cost estimation module 230 includes a cost estimate model 232, a cost estimate training module 234, and a cost estimate inference module 236. The cost estimate training module 234 is generally configured to facilitate training of the cost estimate model 232. As discussed further below, in relation to FIG. 5, in an embodiment the cost estimate training module 234 can be run multiple times to tune the cost estimate model 232. The cost estimate inference module 236 is generally configured to estimate the manufacturing cost of a spare part, using the cost estimate model 232.

In the embodiment illustrated in FIG. 2, the effectivity model 222 is separate from the cost estimate model 232. Alternatively, these could be a single, shared model, or each could be made up of multiple machine learning (ML) models. Further, in the embodiment illustrated in FIG. 2, the effectivity model 222 and the cost estimate model 232 are stored locally in the memory 210 of the prediction server 200. Alternatively, one (or both) of these models could be stored in the storage 270 (e.g., in the data repository 170), in a remote server, or in a cloud based storage system.

FIG. 3 is a flow chart 300 illustrating automatic prediction of the cost of manufacturing a spare part, according to an embodiment. In an embodiment, at block 302, a new customer requests manufacture of a spare part. This could be an external customer, or an internal customer within a business (e.g., another division or group within a business). For example, an external customer could request manufacture of a spare part. Alternatively, an internal customer within a business could request manufacture of a spare part. For example, an Original Equipment Manufacturer (OEM) could request manufacture of a replacement part that is potentially better suited for a particular situation (e.g., more durable, or otherwise better suited). A spare part can refer to a component within a larger structure, for example a mechanical component in an airplane, automobile, or other vehicle. A spare part can be a complete structure, a multi-component part, a single component part, or any other suitable part. Further, a spare part can be a replacement part, e.g., replacing a previously used part, or a new part in a new manufacture.

The system determines whether a cost for the requested spare part is available. This could be done by, e.g., the prediction server 200 illustrated in FIGS. 1 and 2, or any other suitable system. At block 330, the spare part cost is available. At block 350, the spare part cost is provided to the customer.

At block 304, the manufacturing cost for the spare part is not available. At block 306, the prediction server (e.g., the prediction server 200 or another suitable server) predicts the effectivity of a cost estimate for the spare part. This could be done using, e.g., the effectivity prediction module 220 illustrated in FIG. 2, and is discussed in further detail with regard to FIGS. 4 and 5. As discussed in FIG. 2, in an embodiment, the effectivity prediction module 220 can predict the effectivity of the manufacturing cost estimate using an ML model. At block 320, the prediction server 200 trains the effectivity and cost prediction models. This can be done by, for example, the effectivity training module 224 and the cost estimate training module 234, illustrated in FIG. 2. The prediction server 200 can use the part characteristics 172, the historical part costs 176, and any other suitable data. In an embodiment, this data is stored in the data repository 170.

In the illustrated embodiment, after the prediction server 200 trains the effectivity prediction and cost estimate models at block 320, the prediction server 200 uses these models at block 306 to estimate the effectivity of the manufacturing cost estimate for the requested spare part. At block 308, the prediction server 200 evaluates the risk of automatically estimating the manufacturing cost of the spare part. This is discussed in more detail with regard to FIGS. 4, 7, and 8A-B, below.

At block 310, if the prediction server 200 determines that the risk is high, the manufacturing cost of the part is estimated manually at block 310, and the manual estimate is provided to the customer at block 350. If the prediction server 200 determines that the risk is low, the manufacturing cost of the part is estimated automatically at block 312, and the automatic estimate is provided to the customer at block 350. As discussed in more detail with regard to FIG. 4 below, after block 312 the spare part could also be sent for automatic manufacture based on the automatic estimate. This could be done in addition to providing the cost estimate to the customer at block 350, or instead of providing the cost estimate to the customer at block 350.

In an embodiment, the prediction server 200 uses the part cost risk evaluation to further refine the cost prediction and effectivity prediction models. At block 314, the prediction server 200 evaluates the cost prediction model. The prediction server 200 then provides the evaluation to the training module (e.g., the cost estimate training module 234 and the effectivity training module 224) to further refine the model. For example, variances in the cost estimates could be determined and outliers could be removed. As one example, if a given cost estimate applies to a small number of parts, and the estimate was significantly off for a part, the erroneous estimate could be removed from consideration in future predictions.

Figure 4:
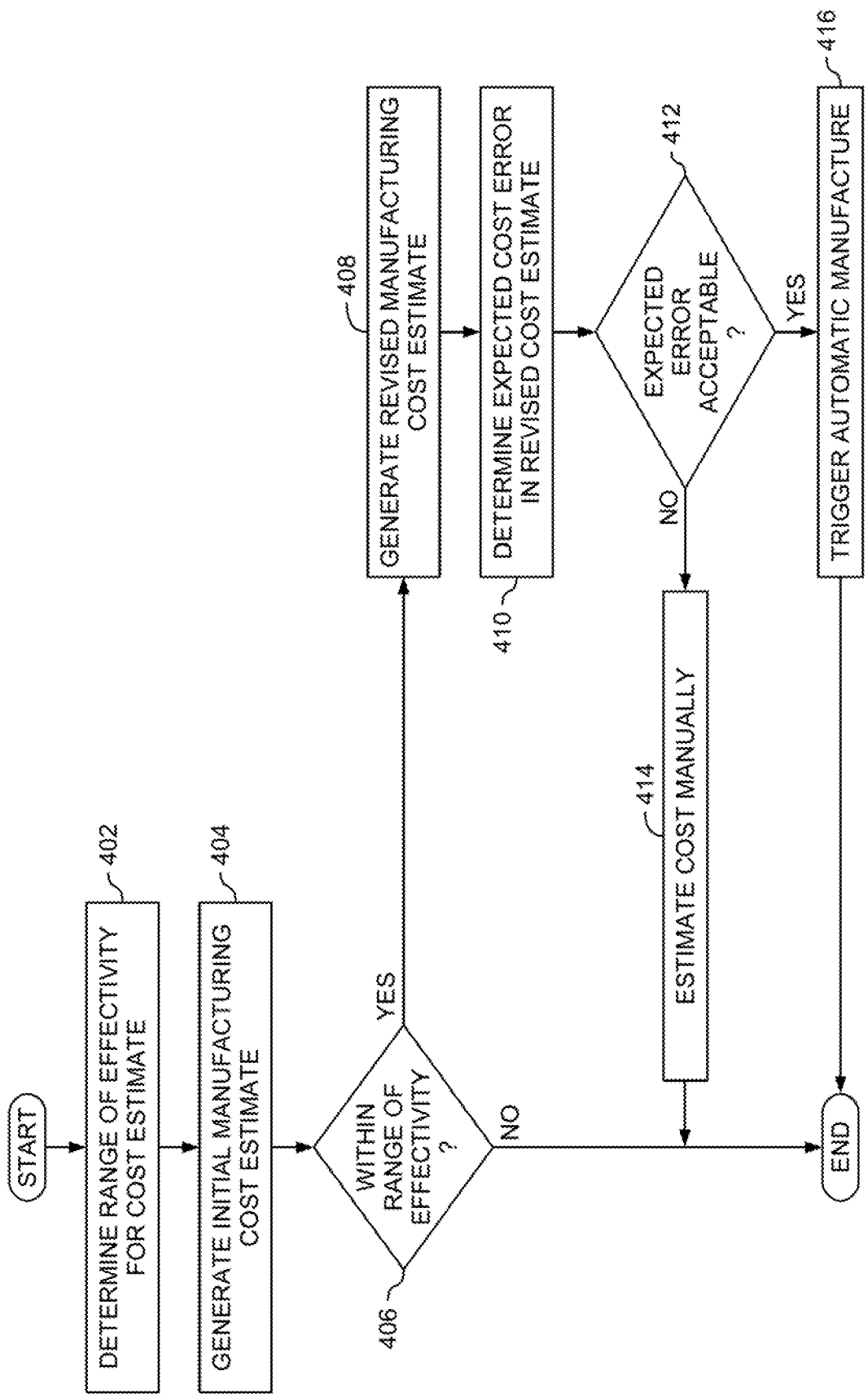
FIG. 4 is a flow chart illustrating automatic manufacture of a spare part, according to one embodiment described herein.

FIG. 4 is a flow chart illustrating automatic manufacture of a spare part, according to an embodiment. At block 402, a prediction server (e.g., the prediction server 200 illustrated in FIG. 2) determines a range of effectivity for manufacturing cost estimates. In an embodiment, this can be done using machine learning—for example, using the effectivity prediction module 220 illustrated in FIG. 2. In an embodiment, the effectivity prediction module 220 can determine minimum and maximum manufacturing cost thresholds. Block 402 is discussed in further detail with regard to FIG. 5.

At block 404, the prediction server 200 generates an initial manufacturing cost estimate. This can be done using a machine learning model. For example, the effectivity inference module 226, illustrated in FIG. 2, can use the effectivity model 222 to generate an initial manufacturing cost estimate. Alternatively, the cost estimate inference module 236 can use the cost estimate model 232 to generate an initial manufacturing cost estimate. As another alternative, another ML model could be used, or non-machine-learning techniques could be used.

At block 406, the prediction server 200 determines whether the initial manufacturing cost estimate falls within the range of effectivity. In an embodiment, this includes determining whether the initial manufacturing cost estimate from block 402 is greater than the minimum manufacturing cost threshold from block 402 and less than the maximum manufacturing cost threshold from block 402. If the initial manufacturing cost estimate does not fall within the range of effectivity, the flow ends.

If the initial manufacturing cost estimate falls within the range of effectivity, the flow proceeds to block 408. At block 408, the prediction server 200 generates a revised manufacturing cost estimate. This is discussed in more detail with regard to FIG. 6, below. At block 410, the prediction server 200 determines the expected cost error in the revised cost estimate. This is discussed in more detail with regard to FIGS. 7 and 8.

At block 412, the prediction server 200 determines whether the expected cost error is acceptable. If the expected cost error is not acceptable, at block 414 the prediction server 200 transmits a request to estimate the cost manually. For example, the prediction server 200 can transmit an electronic notification to suitable employee or department requesting manual estimation of the manufacturing cost of the spare part. Alternatively, automatic manufacturing could be done with specified parameters. For example, the characteristics of the part could be provided to the manufacturer, along with an instruction that the actual cost must be below the estimated cost if the automatic manufacture proceeds. The risk can then be passed to the manufacturer, which may have a higher risk tolerance (or higher margins). As another alternative, the manufacturer could be required to automatically manufacture the part within the estimated cost plus a pre-determined margin.

In an embodiment, a manufacturer could decline to automatically manufacture the spare part under the requested parameters. In this situation, the prediction server 200 could transmit an electronic notification to an alternative manufacturer to initiate automatic manufacture of the spare part. Further, the prediction server 200 could initiate evaluation of the spare part for internal manufacture, or initiate a manual RFP process. In an embodiment, the prediction server 200 can store information relating to the rejected request for automatic manufacture. For example, the prediction server 200 can store this information in the data repository 170, or in another suitable location. The prediction server 200 can then use this stored information for future cost estimation requests. For example, the effectivity training module 224 can use this information about rejected requests for automatic manufacturing to train the effectivity model 222. An another example, the cost estimate training module 234 can use this information about rejected requests for automatic manufacturing to train the cost estimate model 232. Further, in an embodiment, the information related to the rejected request for automatic manufacture can be used to identify a future supplier to manufacture the spare part.

If the expected manufacturing cost error is acceptable, at block 416 the prediction server 200 triggers automatic manufacture of the part. For example, the prediction server 200 can transmit an electronic message to a designated supplier with specifications for the part, and a request to begin automatic manufacturing. After receiving the request, the supplier can automatically manufacture the part based on the specifications. Alternatively, the prediction server 200 can trigger automatic manufacturing by an internal manufacturing entity or subdivision, rather than from a third party supplier.

Figure 5:
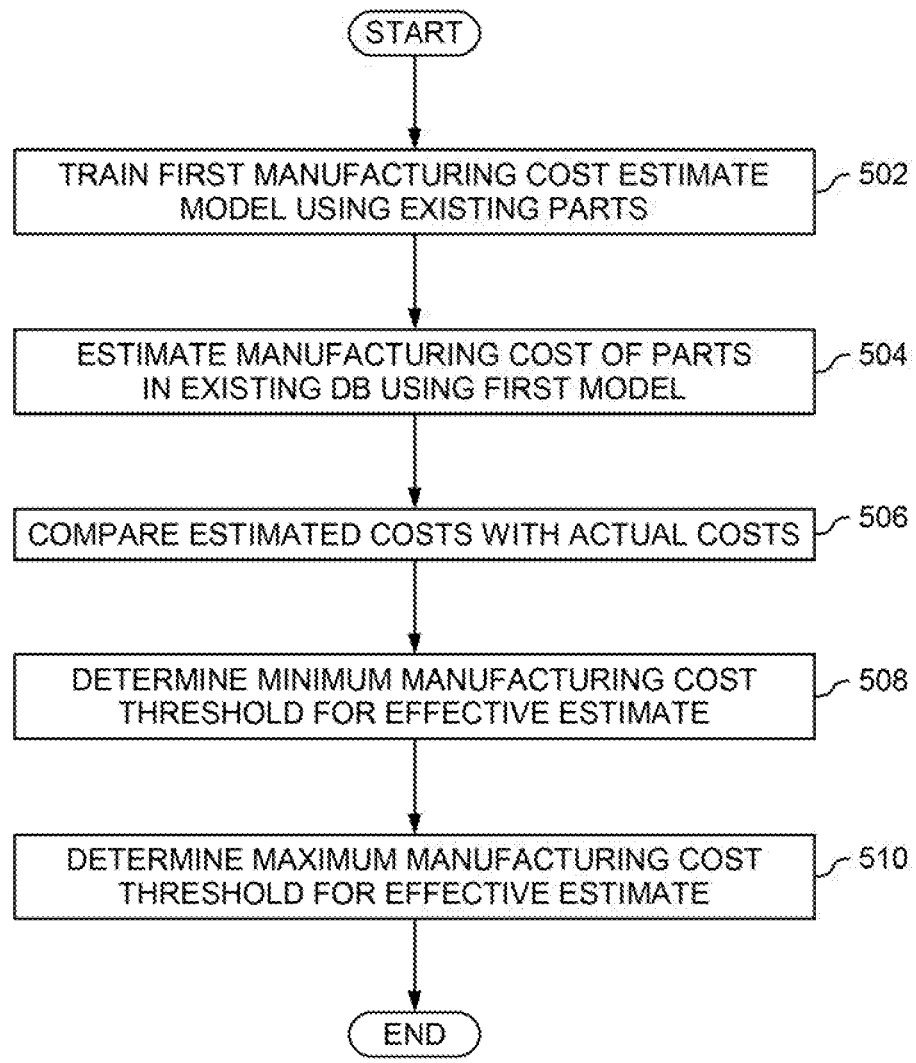
FIG. 5 is a flow chart illustrating identification of a range of effectivity for a manufacturing cost estimate, according to one embodiment described herein.

FIG. 5 is a flow chart illustrating identification of a range of effectivity for a manufacturing cost estimate, according to an embodiment. In an embodiment, this corresponds to block 402 illustrated in FIG. 4. At block 502, a prediction server (e.g., the prediction server 200 illustrated in FIG. 2) trains a first manufacturing cost estimate machine learning model. For example, the effectivity training module 224, illustrated in FIG. 2, can train the effectivity model 222. The training process is discussed in more detail with reference to FIG. 9. A number of suitable machine learning algorithms could be used. In an embodiment, decision trees could be used. Alternatively, random forests could be used. As another alternative, convolutional neural networks could be used. Or another suitable machine learning algorithm could be used.

In an embodiment, there are multiple phases to training the effectivity model. To start, at block 502 the effectivity training module 224 trains the effectivity model 222 to act as a manufacturing cost estimator. After this initial training, the effectivity model 222 can be used to determine an estimated manufacturing cost for a given spare part, based on the characteristics of the spare part.

At block 504, the effectivity training module 224 uses the effectivity model 222 to estimate the cost of the parts in a database of existing parts. For example, the effectivity training module 224 can estimate the manufacturing cost of each part in the database of existing parts. At block 506, the effectivity training module 224 then compares the estimated costs with the actual manufacturing costs of the parts in the existing database. This can be used to further train the effectivity model 222 to determine a range of effectivity for a given part. In an embodiment, blocks 504 and 506 can be repeated, as necessary, to tune the effectivity model 222. At block 508, the effectivity training module 224 can determine a minimum manufacturing cost threshold for effective estimation of the manufacturing cost of a spare part. At block 510, the effectivity training module 224 can determine a maximum manufacturing cost threshold for effective estimation of the manufacturing cost of a spare part. In an embodiment, the effectivity training module 224 can determine the minimum and maximum thresholds using the effectivity model 222. In another embodiment, the effectivity training module 224 can use a different ML model. Alternatively, other techniques, including statistical and mathematical techniques, could be used to determine the minimum and maximum manufacturing cost thresholds.

In an embodiment, the minimum and maximum manufacturing cost thresholds set the boundaries within which a cost estimate is likely enough to be effective to proceed. For example, if a cost estimate for a given part is lower than the minimum threshold, the estimate may not be effective enough to proceed because any error in the cost estimate (e.g., the difference between the estimate and the actual manufacturing cost) would be too high a percentage of the manufacturing cost to make estimation safe for the business. An error that is too high a percentage of the manufacturing cost can wipeout any profit from the sale, and lose money for the seller.

As another example, if a cost estimate for a given part is higher than the maximum threshold, the estimate may not be effective enough to proceed because the sample size used to estimate the expensive part may be too low, and the absolute dollar values involved may be too high. For example, a given seller often sells many fewer very expensive parts, as compared with cheaper parts. This may decrease the sample size for these expensive parts in the data set used to train the effectivity model 222, increasing the likelihood of error in the manufacturing cost estimate. Further, the absolute dollar values involved in estimating the cost of expensive parts may make manual cost estimation preferred. For example, the cost of manual estimation (if it is likely to be more accurate), may be relatively low compared to the potential profit or loss in the sale of the desired part. As another example, for particularly expensive parts it may be desirable for subject matter experts to examine the intricacies of the cost estimate. And as another example, a high cost estimate could signal an error in the estimate, such that a customer would be very unlikely to accept the estimated cost.

In an embodiment, the range of effectivity can vary based on desired parameters. For example, a particular sales organization might be more, or less, tolerant of risk in automatic cost estimation. Or manual estimation might be particularly expensive (or cheap). The error tolerance for the range of effectivity can be configured, and the range determined in response.

Figure 6:
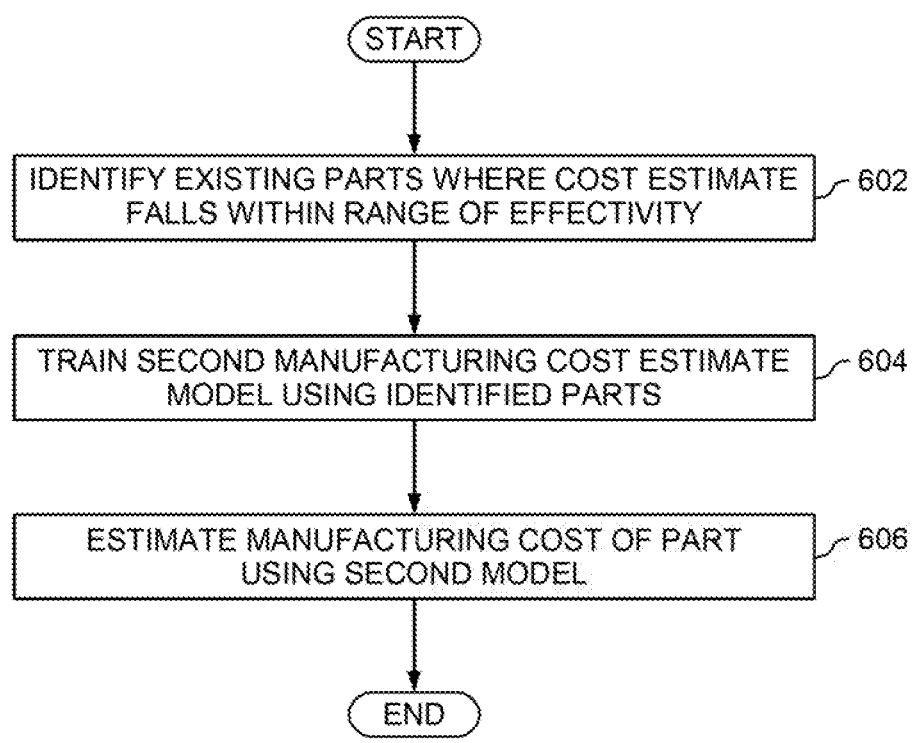
FIG. 6 is a flow chart illustrating generating a revised manufacturing cost estimate, according to one embodiment described herein.

FIG. 6 is a flow chart illustrating generating a revised manufacturing cost estimate, according to an embodiment. In an embodiment, FIG. 6 corresponds to block 408 in FIG. 4. At block 602, a prediction server (e.g., the prediction server 200) identifies existing parts where the cost estimate falls within the range of effectivity. As discussed above in relation to FIG. 5, in an embodiment the prediction server 200 determines a minimum and maximum effectivity threshold for cost estimates by a first machine learning model. The cost estimate training module 234 can identify, for parts in an existing parts database, whether the manufacturing cost estimate for the part falls within the range of effectivity (e.g., the estimate is higher than the minimum threshold and lower than the maximum threshold). In an embodiment, the cost estimate training module 234 can do this for all parts in the existing parts database. In another embodiment, the cost estimate training module 234 can do this for a subset of parts in the existing parts database.

At block 604, the cost estimate training module 234 uses the parts for which the estimated manufacturing cost (e.g., estimated using the effectivity model 222) falls within the range of effectivity to train a second machine learning model (e.g., the cost estimate model 232). In an embodiment, only estimates falling within the range of effectivity are used to train the cost estimate model 232. Alternatively, additional estimates could be used. In an embodiment, blocks 602 and 604 could be repeated, as necessary, to tune the cost estimate model 232.

A number of suitable machine learning algorithms could be used. In an embodiment, decision trees could be used. Alternatively, random forests could be used. As another alternative, convolutional neural networks could be used. Or another suitable machine learning algorithm could be used.

At block 606, the cost estimate inference module 236 uses the cost estimate model 232 to estimate the manufacturing cost of a given replacement part.

Figure 7:
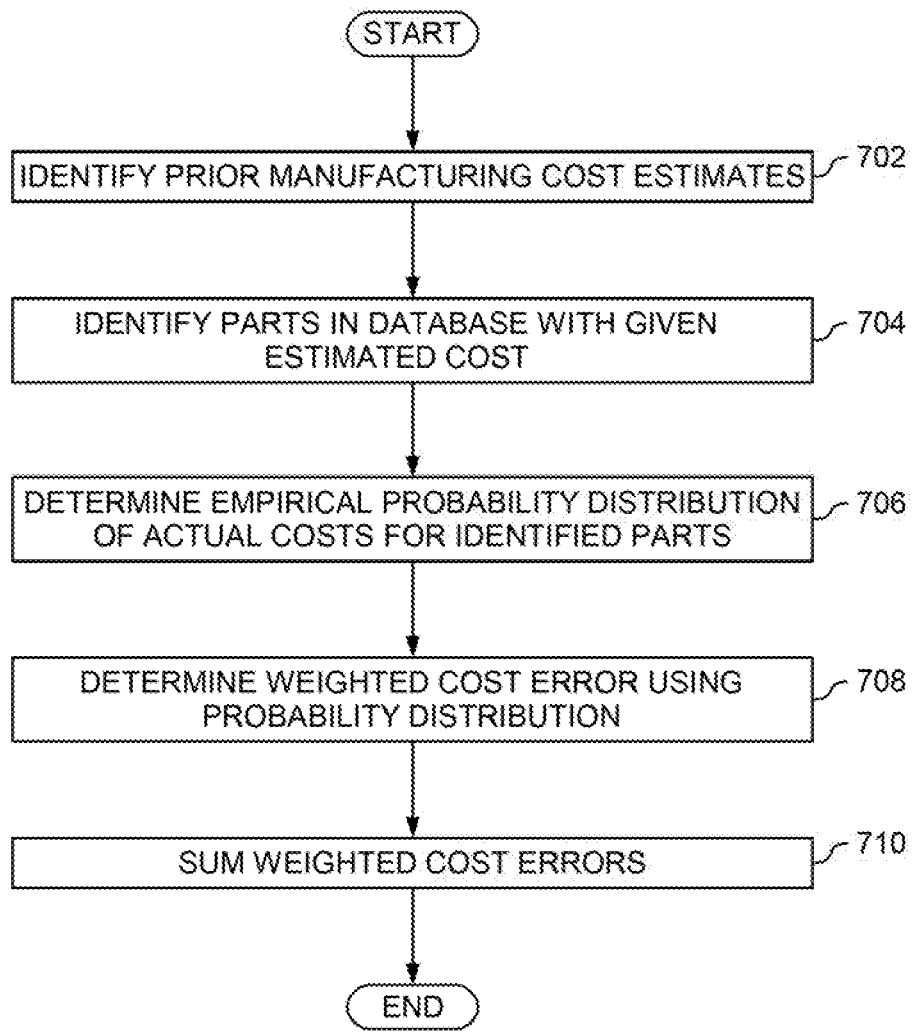
FIG. 7 is a flow chart illustrating determining an expected cost error in a manufacturing cost estimate, according to one embodiment described herein.

FIG. 7 is a flow chart illustrating determining an expected cost error in a manufacturing cost estimate, according to an embodiment. In an embodiment, FIG. 7 corresponds to block 410 in FIG. 4. At block 702, a prediction server (e.g., the prediction server 200 illustrated in FIG. 2) identifies each different previous cost estimate in a database of parts. At block 704, for each given estimate value (e.g., for each cost estimate dollar value for any prior estimate in the database), the parts for which that value was an estimated cost are identified. For example, a database might include part estimate values of $250, $251, $272, $300, etc. In an embodiment, at block 702, the prediction server 200 identifies each of these values. At block 704, for a given value (e.g., $251), all parts in the database that were (at some point) estimated to have a manufacturing cost of $251 are identified.

At block 706, the prediction server 200 determines an empirical probability distribution of actual costs for the identified parts. In an embodiment, for a given cost estimate value the prediction server 200 divides parts with that cost estimate into groups by actual cost. For example, using the $251 estimate discussed above, assume that ten parts had an estimate of $251: three parts with a $251 estimate had an actual cost of $240, two had an actual cost of $250, four had an actual cost of $255, and one had an actual cost of $300. The ten parts would be divided into groups, with parts having the same (or similar) actual costs grouped together. The prediction server 200 can then determine the number of parts in each respective actual cost group (e.g., 3 parts in a first group, 2 parts in a second group, 4 parts in a third group, 1 part in a fourth group), and determine the empirical probability that a part with the given cost estimate will have one of these actual costs by dividing the number of parts in the respective actual cost group by the total number of parts that have a given cost estimate. For example, using the example above, there is a 30% empirical probability that a part estimated to cost $251 will actually cost $240 for manufacture, a 20% chance the part will actually cost $250, a 40% chance the part will actually cost $255, and a 10% chance the part will actually cost $300 to manufacture.

At block 708, the prediction server 200 determines the weighted cost error for a given cost estimate using the probability distribution. In an embodiment, this can be done by calculating the difference between the estimated cost and actual cost (for each actual cost value tied to a given estimate), and multiplying the difference by the calculated empirical probability. At block 710, the prediction server 200 sums the weighted cost errors.

In an embodiment, if the estimated cost is high compared to the actual cost of parts that have the given estimated cost, then the sum of the weighted cost errors will be positive. If the estimated cost is low compared to the actual cost of parts that have the given estimate cost, then the sum of the weighted cost errors will be negative. In an embodiment, the calculated sum of the weighted cost is determined by both the actual costs and their empirical probability (as discussed above), and not a simple comparison of only costs. Alternatively, the sum of the weighted cost could be determined based on a simple comparison of the cost estimate with the actual cost.

For example, it may be considered safe to order automatic manufacture of a given part, when the calculated weighted cost error is positive (indicating that any error is likely to result in an estimate higher than the actual cost), and it may be considered unwise to order automatic manufacture of a given part when the calculated weighted cost error is negative (indicating an error is likely to result in an estimate lower than the actual cost—potentially resulting in a business loss to the seller). In other words, when the calculated weighted cost error is positive, the part can be ordered for automatic manufacture with the expectation that the actual cost will be less than or equal to the estimated cost. When the calculated weighted cost error is negative, if the part is ordered for automatic manufacture there is a risk that the actual cost will be greater than the estimated cost. In an embodiment, whether the weighted cost error is positive or negative is taken into account when considering automatic manufacture. In another embodiment, the absolute value of the weighted cost error may also be taken into account—even if a weighted cost error is positive, if it is sufficiently high, that may indicate a problem with the estimate.

Figure 8B:
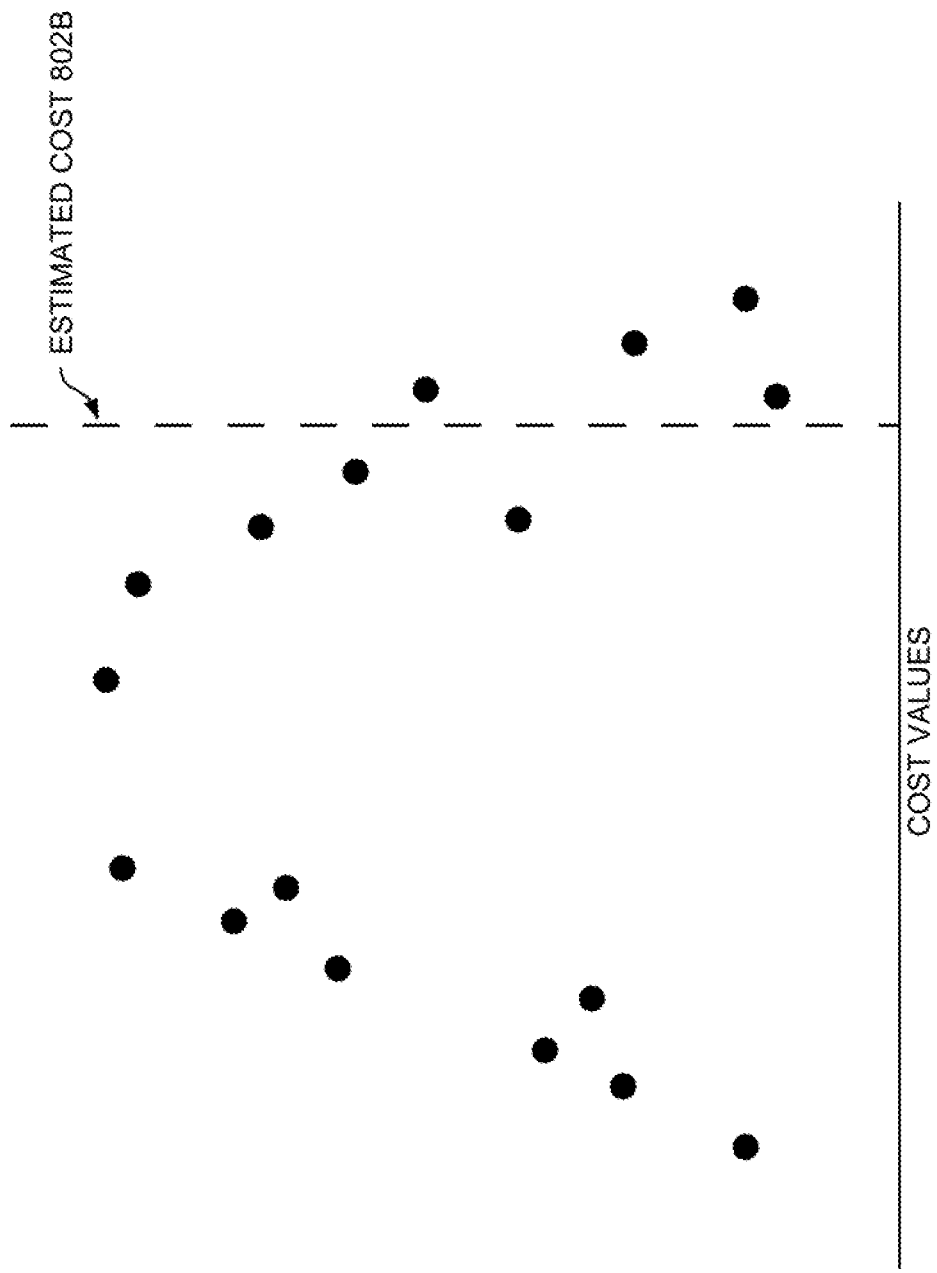

FIGS. 8A-B are illustrations of estimated and actual manufacturing costs, according to an embodiment. The figure illustrates a distribution of actual manufacturing costs for a given estimated cost. The x-axis represents cost values (e.g., in dollars). The dots represent actual costs. The y-axis represents the probability of each actual cost occurring, for the given estimated cost. As illustrated in FIG. 8A, the estimated cost 802A is lower than the majority of actual costs. This makes automatic manufacturing potentially undesirable. In FIG. 8B, however, the estimated cost 802B is higher than the majority of actual costs. This makes automatic manufacturing potentially desirable. In an embodiment, if the estimated manufacturing cost is lower than the majority of actual costs (e.g., as illustrated in FIG. 8A), the average of the actual costs can instead be used as an estimate—this can allow for automatic manufacturing, while mitigating the risk.

Figure 9:
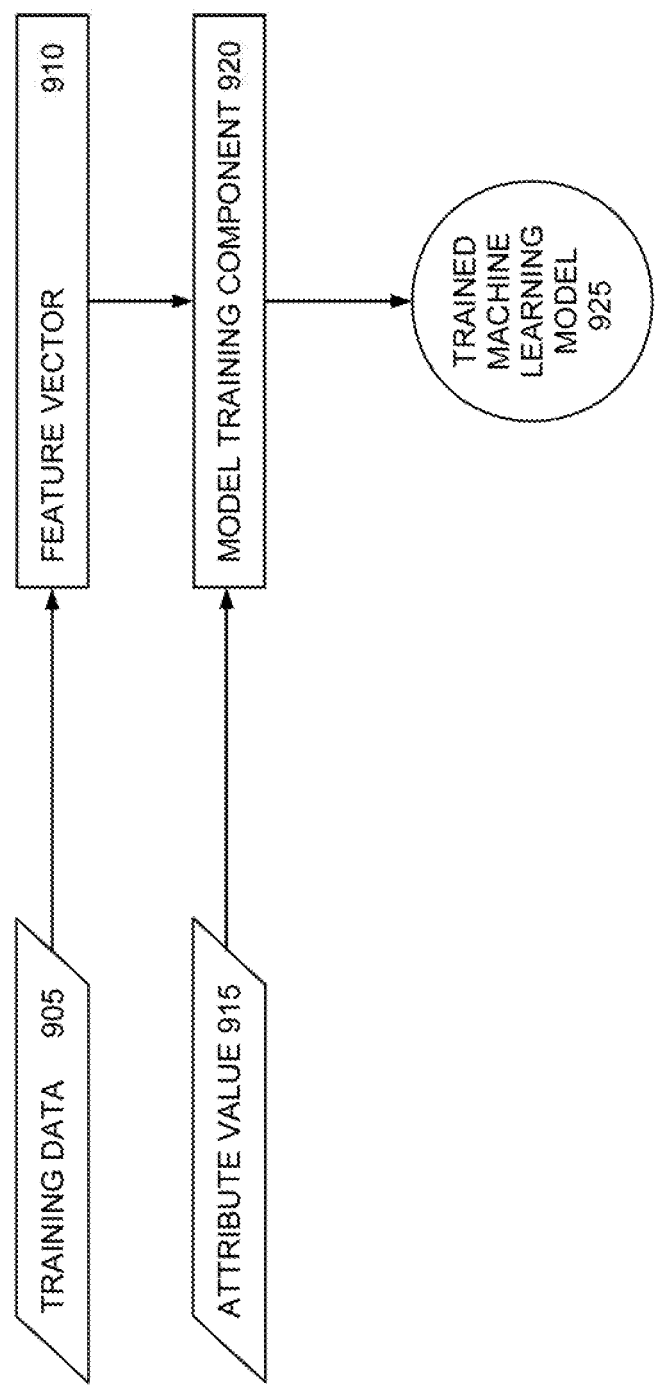
FIG. 9 is a flow chart illustrating training of a machine learning model, according to one embodiment described herein.

FIG. 9 illustrates generating and updating a supervised machine learning model, according to an embodiment. As used herein, "trained machine learning" is used interchangeably with "supervised machine learning," and generally refers to machine learning that utilizes exemplars and pre-determined attribute scores to train the model. As illustrated, a corpus of training data 905 is converted into feature vectors 910. These feature vectors 910 are provided to a model training component 920, along with a set of associated attribute values 915. That is, the training data 905 is associated with one or more attribute values 915 for the principle attributes used by the system, wherein each of the one or more attribute values 915 represents a measure of an attribute indicated by the corresponding training data 905. The model training component 920 uses supervised machine learning techniques to generate and update a trained machine learning model 925, which can then be used to process new electronic data. Such techniques may include classification and regression techniques, among others. In this way, an updated model can be maintained.

For example, features that may have a deterministic effect on the manufacturing cost of a spare part can be identified, either manually by a subject matter expert, automatically using a computer program, or using another machine learning model. For each feature (such as weight, length, material, etc.), in an embodiment one can define a set of discrete descriptors (such as A for parts with weight between 0 and 2 pounds, B for parts weight between 2 and 5 pounds, C for weight between 5 and 10 pounds, etc.). Alternatively, any feature can also be continuous or categorical. In an embodiment, different transformation methods can be used to create feature vector(s) corresponding to the feature. For example, z-score or log transformation could be used to transform and normalize a continuous feature. As another example, a categorical feature can be transformed to a binary output (e.g., using one hot encoding) or can be bucketized.

For each part in the database of existing parts, a feature vector can be determined by considering each feature in a pre-determined order and recording the discrete descriptor that best characterizes that feature of the part. This feature vector can be used by the training module (e.g., the effectivity training module 224 or the cost estimate training module 234) to train a machine learning model (e.g., the effectivity model 222 or the cost estimate model 232).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., prediction server 200) or related data available in the cloud. For example, one or both of the effectivity prediction module 220 and the cost estimation module 230 could execute on a computing system in the cloud. In such a case, each module could access training data stored at a storage location in the cloud, and could store the machine learning model and associated data in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method for automatically manufacturing mechanical parts, the method comprising:
   determining a range of effectivity for a first machine learning model, wherein the first machine learning model is a supervised machine learning model, and is trained by a first plurality of existing mechanical parts in database, wherein determining the range of effectivity for the first machine learning model comprises:
      generating estimated manufacturing costs for the first plurality of existing mechanical parts using the first machine learning model;
      comparing the estimated manufacturing costs with respective actual manufacturing costs of the first plurality of existing mechanical parts; and
      subsequently to comparing the estimated manufacturing costs with respective actual manufacturing costs, identifying a minimum manufacturing cost threshold and a maximum manufacturing cost threshold for the first machine learning model;
   generating, using one or more computer processors, a first estimate of manufacturing cost for a first mechanical part using the first machine learning model;
   upon determining that the first estimate of manufacturing cost for the first mechanical part falls within the range of effectivity for the first machine learning model, and generating, using the one or more computer processors, a second estimate of manufacturing cost for the first mechanical part using a second machine learning model different from the first machine learning model, wherein:
      the second machine learning model is a supervised machine learning model, and is trained by a second plurality of existing mechanical parts in database, where each of the second plurality of existing mechanical parts has an estimated manufacturing cost, generated by the first machine learning model, falling within the range of effectivity for the first machine learning model, and
      at least one of the first or the second machine learning model is a neural network model;
   determining an expected cost error in the second estimate of manufacturing cost for the first mechanical part;
   upon determining that the expected cost error falls within a pre-determined acceptable range, facilitating automatic manufacturing of the first mechanical part, comprising:
      transmitting computer readable instructions to be read by a computer and automatically trigger a start of the automatic manufacturing of the first mechanical part;
   generating, using the one or more computer processors, a third estimate of manufacturing cost for a second mechanical part using the first machine learning model;

upon determining that the third estimate of manufacturing cost for the second mechanical part falls outside the range of effectivity for the first machine learning model, marking the second mechanical part as not suitable for automatic manufacturing;

generating, using the one or more computer processors, a fourth estimate of manufacturing cost for a third mechanical part using the second machine learning model;

determining a second expected cost error in the fourth estimate of manufacturing cost for the third mechanical part; and upon determining that the second expected cost error falls outside a second pre-determined acceptable range, marking the third mechanical part as not suitable for automatic manufacturing.

2. The method of claim 1, wherein determining that the first estimate of manufacturing cost for the first mechanical part falls within the range of effectivity for the first machine learning model further comprises:

determining, using the one or more computer processors, the range of effectivity for the first machine learning model in estimating manufacturing cost of one or more mechanical parts by:

estimating manufacturing costs of the one or more mechanical parts using the first machine learning model;

identifying actual manufacturing costs of the one or more mechanical parts; and comparing the estimated manufacturing costs with the actual manufacturing costs.

3. The method of claim 1, the range of effectivity comprising a minimum estimated cost threshold and a maximum estimated cost threshold, wherein determining that the first estimate of manufacturing cost for the first mechanical part falls within the range of effectivity for the first machine learning model comprises determining that the first estimate is greater than the minimum estimated cost threshold and less than the maximum estimated cost threshold.

4. The method of claim 1, further comprising:

identifying a plurality of prior manufacturing cost estimates relating to the first plurality of existing mechanical parts;

determining that a first prior manufacturing cost estimate falls within the range of effectivity for the first machine learning model; and training the second machine learning model using data related to the first prior manufacturing cost estimate.

5. The method of claim 4, further comprising:

determining that a second prior manufacturing cost estimate falls outside the range of effectivity for the first machine learning model; and excluding data related to the second prior manufacturing cost estimate from use during training of the second machine learning model.

6. The method of claim 1, wherein determining the expected cost error further comprises:

determining an empirical probability distribution relating to a first manufacturing cost estimate value;

determining one or more weighted cost errors for the first manufacturing cost estimate value, based on the empirical probability distribution; and determining a sum of the one or more weighted cost errors.

7. The method of claim 1, wherein the first machine learning model and the second machine learning model each respectively comprise one of: (i) a decision tree model, (ii) a random forest model, or (iii) a neural network.

8. A system, comprising:

a processor; and a memory storing a program, which, when executed on the processor, performs an operation, the operation comprising:

determining a range of effectivity for a first machine learning model, wherein the first machine learning model is a supervised machine learning model, and is trained by a first plurality of existing mechanical parts in database, wherein determining the range of effectivity for the first machine learning model comprises:

generating estimated manufacturing costs for the first plurality of existing mechanical parts using the first machine learning model, comparing the estimated manufacturing costs with respective actual manufacturing costs of the first plurality of existing mechanical parts, subsequently to comparing the estimated manufacturing costs with respective actual manufacturing costs, identifying a minimum manufacturing cost threshold and a maximum manufacturing cost threshold for the first machine learning model;

generating a first estimate of manufacturing cost for a first mechanical part using the first machine learning model;

upon determining that the first estimate of manufacturing cost for the first mechanical part falls within the range of effectivity for the first machine learning model, and generating a second estimate of manufacturing cost for the first mechanical part using a second machine learning model different from the first machine learning model, wherein:

the second machine learning model is a supervised machine learning model, and is trained by a second plurality of existing mechanical parts in database, where each of the second plurality of existing mechanical parts has an estimated manufacturing cost, generated by the first machine learning model, falling within the range of effectivity for the first machine learning model, and at least one of the first or the second machine learning model is a neural network model;

determining an expected cost error in the second estimate of manufacturing cost for the first mechanical part;

upon determining that the expected cost error falls within a pre-determined acceptable range, facilitating automatic manufacturing of the first mechanical part, comprising:

transmitting computer readable instructions to be read by a computer and automatically trigger a start of the automatic manufacturing of the first mechanical part;

generating a third estimate of manufacturing cost for a second mechanical part using the first machine learning model;

upon determining that the third estimate of manufacturing cost for the second mechanical part falls outside the range of effectivity for the first machine learning model, marking the second mechanical part as not suitable for automatic manufacturing;

generating a fourth estimate of manufacturing cost for a third mechanical part using the second machine learning model;

determining a second expected cost error in the fourth estimate of manufacturing cost for the third mechanical part; and upon determining that the second expected cost error falls outside a second pre-determined acceptable range, marking the third mechanical part as not suitable for automatic manufacturing.

9. The system of claim 8, wherein determining that the first estimate of manufacturing cost for the first mechanical part falls within the range of effectivity for the first machine learning model further comprises:

determining the range of effectivity for the first machine learning model in estimating manufacturing cost of one or more mechanical parts by:

estimating manufacturing costs of the one or more mechanical parts using the first machine learning model;

identifying actual manufacturing costs of the one or more mechanical parts; and comparing the estimated manufacturing costs with the actual manufacturing costs.

10. The system of claim 8, the operation further comprising:

identifying a plurality of prior manufacturing cost estimates relating to the first plurality of existing mechanical parts;

determining that a first prior manufacturing cost estimate falls within the range of effectivity for the first machine learning model;

training the second machine learning model using data related to the first prior manufacturing cost estimate;

determining that a second prior manufacturing cost estimate falls outside the range of effectivity for the first machine learning model; and excluding data related to the second prior manufacturing cost estimate from use during training of the second machine learning model.

11. The system of claim 8, wherein determining the expected cost error further comprises:

determining an empirical probability distribution relating to a first manufacturing cost estimate value;

determining one or more weighted cost errors for the first manufacturing cost estimate value, based on the empirical probability distribution; and determining a sum of the one or more weighted cost errors.

12. A computer program product for automatically manufacturing mechanical parts, the computer program product comprising:

a computer-readable storage medium having computer-readable program code embodied therewith, the computer-readable program code executable by one or more computer processors to perform an operation, the operation comprising:

determining a range of effectivity for a first machine learning model, wherein the first machine learning model is a supervised machine learning model, and is trained by a first plurality of existing mechanical parts in database, wherein determining the range of effectivity for the first machine learning model comprises:

generating estimated manufacturing costs for the first plurality of existing mechanical parts using the first machine learning model;

comparing the estimated manufacturing costs with respective actual manufacturing costs of the first plurality of existing mechanical parts; and subsequently to comparing the estimated manufacturing costs with respective actual manufacturing costs, identifying a minimum manufacturing cost threshold and a maximum manufacturing cost threshold for the first machine learning model;

generating a first estimate of manufacturing cost for a first mechanical part using the first machine learning model;

upon determining that the first estimate of manufacturing cost for the first mechanical part falls within the range of effectivity for the first machine learning model, and generating a second estimate of manufacturing cost for the first mechanical part using a second machine learning model different from the first machine learning model, wherein:

the second machine learning model is a supervised machine learning model, and is trained by a second plurality of existing mechanical parts in database, where each of the second plurality of existing mechanical parts has an estimated manufacturing cost, generated by the first machine learning model, falling within the range of effectivity for the first machine learning model, and at least one of the first or the second machine learning model is a neural network model;

determining an expected cost error in the second estimate of manufacturing cost for the first mechanical part;

upon determining that the expected cost error falls within a pre-determined acceptable range, facilitating automatic manufacturing of the first mechanical part, comprising:

transmitting computer readable instructions to be read by a computer and automatically trigger a start of the automatic manufacturing of the first mechanical part;

generating a third estimate of manufacturing cost for a second mechanical part using the first machine learning model;

upon determining that the third estimate of manufacturing cost for the second mechanical part falls outside the range of effectivity for the first machine learning model, marking the second mechanical part as not suitable for automatic manufacturing;

generating a fourth estimate of manufacturing cost for a third mechanical part using the second machine learning model;

determining a second expected cost error in the fourth estimate of manufacturing cost for the third mechanical part; and upon determining that the second expected cost error falls outside a second pre-determined acceptable range, marking the third mechanical part as not suitable for automatic manufacturing.

13. The computer program product of claim 12, wherein determining that the first estimate of manufacturing cost for the first mechanical part falls within the range of effectivity for the first machine learning model further comprises:

determining, using the one or more computer processors, the range of effectivity for the first machine learning model in estimating manufacturing cost of one or more mechanical parts by:

estimating manufacturing costs of the one or more mechanical parts using the first machine learning model;

identifying actual manufacturing costs of the one or more mechanical parts; and comparing the estimated manufacturing costs with the actual manufacturing costs.

14. The computer program product of claim 12, the operation further comprising:
- identifying a plurality of prior manufacturing cost estimates relating to the first plurality of existing mechanical parts;
- determining that a first prior manufacturing cost estimate falls within the range of effectivity for the first machine learning model;
- training the second machine learning model using data related to the first prior manufacturing cost estimate;
- determining that a second prior manufacturing cost estimate falls outside the range of effectivity for the first machine learning model; and
- excluding data related to the second prior manufacturing cost estimate from use during training of the second machine learning model.

\* \* \* \* \*